Feb. 21, 1939.     J. S. LOEWUS     2,147,660
VIBRATION DAMPENER
Filed Dec. 5, 1936     3 Sheets-Sheet 2

JULIAN S. LOEWUS
INVENTOR

BY *Robert A. Lavender*
ATTORNEY

Feb. 21, 1939. J. S. LOEWUS 2,147,660
VIBRATION DAMPENER
Filed Dec. 5, 1936 3 Sheets-Sheet 3
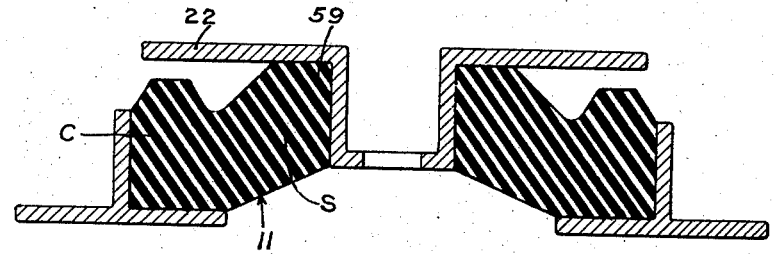
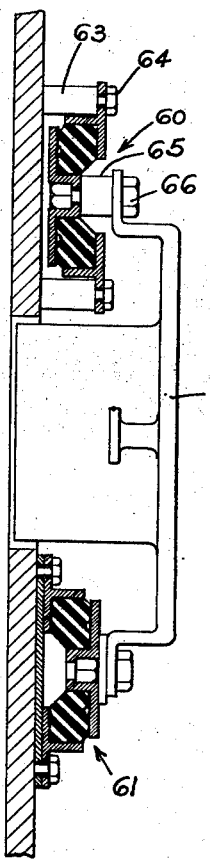
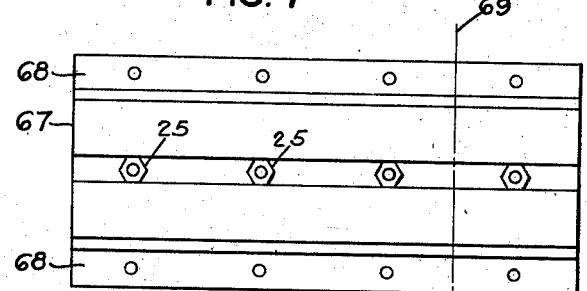
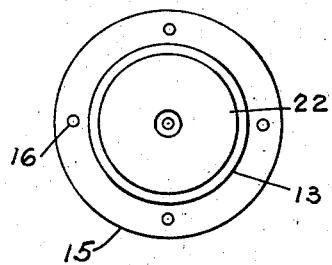
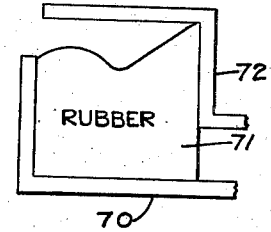
JULIAN S. LOEWUS
INVENTOR
BY
ATTORNEY Patented Feb. 21, 1939

2,147,660

UNITED STATES PATENT OFFICE 2,147,660

VIBRATION DAMPENER

Julian S. Loewus, Baltimore, Md.

Application December 5, 1936, Serial No. 114,342

6 Claims. (Cl. 248—358)

(Granted under the act of March 3, 1883, as amended April 30, 1928; 370 O. G. 757)

This invention relates to a vibration dampener and has for an object to provide an improved vibration dampener which acts as a cushion support for machinery or heavy objects, and which further may be used whether the object or load is supported on a floor or on a wall at any angle, or suspended from above.

A further object of this invention is to provide a vibration dampener which includes a rubber cushion which functions under combined shear and compression, first in sequence, then in parallel, and which is so designed that it is impossible for the load to tear loose under any conditions, the dampener including at least two metallic elements between which the rubber cushion is placed, the metallic elements being so located with reference to each other that they would fully support the load irrespective of the presence or absence of the rubber cushion therebetween, so that even if there were to be a partial or a complete failure of the cushion, as for instance in the case of a fire burning up the cushion, the metallic parts would still support the load.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views, and in which Fig. 1 is a sectional view of one form of the vibration dampener with no load thereon;

Fig. 7 is a sectional view of still another modified form of this invention;

Fig. 8 is a sectional view of the vibration dampener of Fig. 7 which is used on a vertical wall;

Fig. 9 is a plan view of the vibration dampener in its last step of manufacture, just before the individual units are cut apart;

Fig. 10 is a top plan view of the vibration dampener made circular in outline, and Fig. 11 is a partial side view of a modification of the form of invention shown in Fig. 1.

Figure 1:
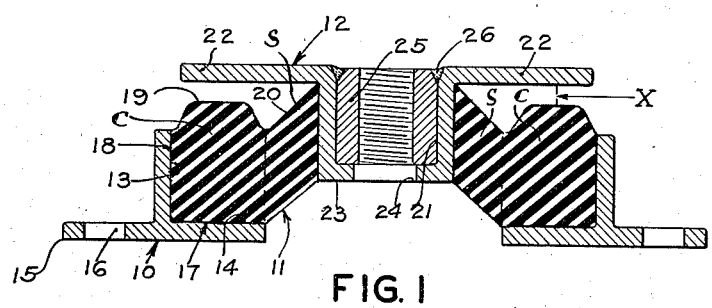

The vibration dampener of this invention may be made either in circular outline, as shown in Fig. 10, or in rectangular outline, as shown in Fig. 9, the dampener shown in Figs. 1 to 11, inclusive, being either rectangular or circular, as may be preferred.

In the form of the invention shown in Figs. 1 to 4, the vibration dampener includes a base 10, a rubber body 11, and a load carrying member 12. The base 10 is preferably of inverted T shape in cross-section and is provided with a vertical abutment 13 and a horizontal abutment 14 in which is seated the rubber body 11, while an attached flange 15 with bolt opening 16 extends outwardly from the horizontal abutment 14. The rubber body 11 comprises a compression portion C and a shear portion S. The dotted line to which the arrows point in Fig. 4 divides the same for a vertically applied load P. The compression portion C of the rubber body 11 is provided with a bottom surface 17 adapted to completely seat on the abutment 14, and a vertical side wall 18 is adapted to completely engage the vertical abutment 13, the top of the compression portion C being shaped to define a projecting cushion or pad 19. Inclining upwardly from the other side of the compression portion C is a shear portion S which terminates in a side wall 20 substantially parallel to the side wall 18. The shear portion S is preferably formed to extend above the uppermost surface of the pad 19, and may be of a width less than the width of the compression portion C. It should be noted that the shear portion S completely overhangs the horizontal abutment 14.

The load carrying member 12 is provided with a central depending channel portion 21 having horizontal laterally directed flanges or abutments 22 lying in this case in the same plane. If the vibration dampener is made in rectangular outline, as shown in Fig. 9, then the abutments 22 will be separate flanges and the bases 10 will be separate members, while the entire base is in one plane and the load carrying members are in another plane; each portion of either may lie in different planes or even on curves, or if the vibration dampener be circular in outline, as shown in Fig. 10, then the abutments 22 will be one continuous member, while the bases 10 with abutments 13 and 14 and flange 15 will likewise be one continuous member.

The depth of the channel portion 21 may be equal to the vertical depth of the shear portion S while the length of the flanges 22 is such as to cover the pads but will terminate short of the vertical abutment 13. Thus, in the case of a partial or a complete failure of the cushion body 11, as for instance, in case of fire, the abutments 22 would be supported on the abutments 14 to thus continue to carry the load that may be thereon. The bottom wall 23 of the channel 21 may be provided with a central bolt opening 24. A nut 25 may be provided within the channel 21 and secured thereto by any suitable means, such as by welding 26.

The base 10, rubber body 11, and load carrying member 12 are united into a single unitary device by bonding the rubber body to the base abutments 13 and 14 at the walls 17 and 18 and to the channel portion 21 at the shear portion wall 20 in a manner well known to the art. In the free or no-load condition of the dampener there is normally a clearance X between the pad 19 and the flange 22.

Figure 2:
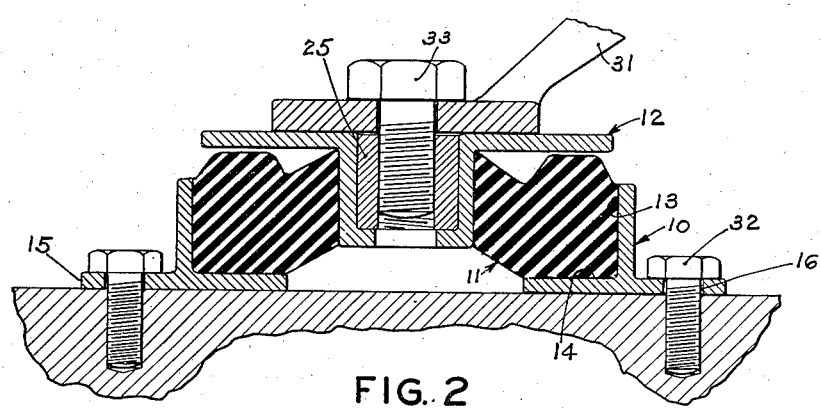
Fig. 2 is a similar view showing a light load supported thereabove.

The vibration dampener of this invention, as shown in Fig. 2, is used in supporting a load by means of a bracket or leg 31 above a floor or deck, bolts 32 extending through the bolt holes 16 to attach the base 10 to the floor. A bolt 33 threaded into the nut 25 secures the leg or bracket 31 to the vibration dampener or cushion support of this invention. Should it be desired to support the leg or bracket 31 at a different angle, shims may be placed either under the leg 31 or under one end of the base 10 in a well-known manner.

Figure 3:
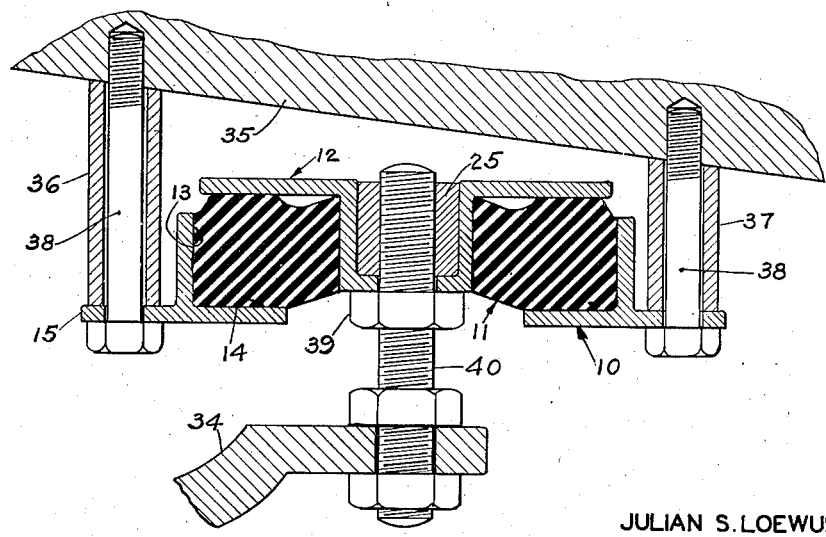
Fig. 3 is a similar view of Fig. 1 showing a heavy load supported therebelow from an angular ceiling.

In Fig. 3 the vibration dampener is shown as used for supporting one leg or bracket 34 of a suspended machine or other structure from a deck beam or other overhanging supporting structure 35. In the illustration, a supporting structure has been shown as being angular and, hence, suitable spacer sleeves 36 and 37 cut from pipe are arranged between flanges 15 and the deck beam 35, the sleeve 37 being appropriately shorter than the sleeve 36 so as to maintain the dampener at the desired horizontal angle. Bolts 38 extend through the flange 15 and the spacer sleeves attach the dampener to the supporting structure 35. The load leg 34 is mounted on the dampener through the means of a bolt 40 extending through the nut 25, the lock nut 39 holding the bolt 40 in properly adjusted position.

Figure 4:
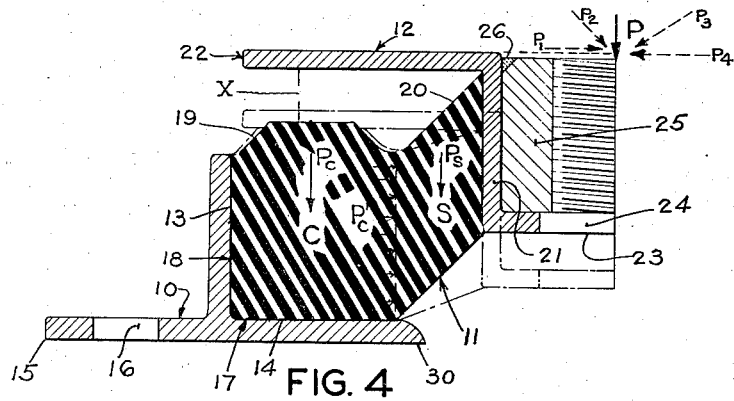
Fig. 4 is a sectional fragmentary view illustrating the stresses when subjected to heavy loading.

The operation of the vibration dampener under a vertical load P is clearly shown in Fig. 4. At no load position the flange 22 is placed a distance equal to the clearance X from the pad 19. With the support in use, the load P, on the load carrier member 12, will first deflect the shear portion S downwardly, as indicated by the dot-dash lines, and then bringing the flange 22 into contact with the pad 19, whereupon the load P is divided, being carried in part $P_c$ by the compression portion C and in part $P_s$ by the shear portion S. Furthermore, the compression forces acting within the compression portion C will react against the shear portion S, placing the same under additional compression, as indicated by the arrows $P'_c$. The action of the shear portion S may be stiffened by providing a curved extension 30 on the inside edge of the horizontal abutment 14 to brace the shear portion S under extreme loads, reducing its effective width as the load is increased.

While Fig. 4 shows a half section of the cushion support with no load, and also a heavy load applied in the direction of the arrow, it may be pointed out that the load may take other directions. For convenience loads $P_1$, $P_2$, $P_3$ and $P_4$ have been chosen as examples, so as to explain how the support would react under loads applied in various directions.

If the angular loads $P_2$ and $P_3$ are considered first, the load $P_2$ will tend to make the portion S act as a cantilever, producing a tensile stress or tearing along line $P^1_c$, where the fracture would normally occur, with the greatest intensity at the top or cup. However, the portion being made of rubber, which is pliable, will thus distribute the tensile stress. Under this condition the portion C will distort slightly but there will be no fracture, as the intensity along line $P^1_c$ has been greatly reduced by transmitting this stress over a greater area as well as transforming this tensile stress into a shear stress which can be more easily resisted by the bond between the steel T and the rubber. On the other hand, the load $P_3$ is a compression load, on the portion S, and can be easily withstood.

If the loads $P_1$ and $P_4$ are now considered, the load $P_1$ will have, in part, a cantilever effect in addition to the tensile stress. These stresses will be transmitted from the S portion to the C portion, as described above, and distributed primarily as shown along the bottom of the steel T. On the other hand, the load $P_4$ will produce compression as well as the cantilever effect. These stresses will be distributed as shear along the bottom of the steel T and compression along the back of the steel T.

It will be noted that this construction produces a noise and vibration dampener of extremely high capacity, great strength and a cushioning action both longitudinally and laterally, or at any intermediary point thereof. The load carrying member 12 may also assume an angular relationship with respect to the base 10, the shear portion S accommodating the same.

It will be further observed that the action of the dampener under load imposes no strain upon the bond between the rubber and metal parts, thus obviating any breakage of the same. Because of the rubber block 11 being locked between the abutments 14 and the flanges 22, there can be no collapse of the dampener in use. The shear portion S can never be stressed to a point where fracture or rupture within the rubber body may occur.

When made in circular form, as shown in Fig. 10, a bonding between the rubber block 11 and the abutments 13 and 14 of base 10 may be omitted, if desired, in which case the block may be made slightly oversized and compressed within the base 10. Similarly, the other bonding may be omitted by making the shear portion oversized. The above stress analysis, while applying to the round type, changes very rapidly from one section to another.

Figure 5:
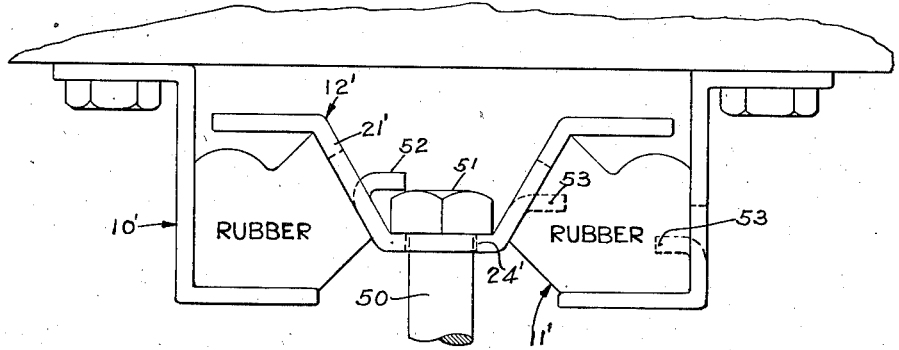
Fig. 5 is a side elevation of a modified form of the vibration dampener.

The bonding will preferably be retained, however, especially in cases where the object may be subjected to other than supporting stresses, such as on shipboard where the rolling of the ship or other causes may result in a jumping action, tending to throw the objects upwardly. As shown in Fig. 5, the base portion 12' is shown as having an angular channel portion 21'. A supporting bolt 50 extends through bolt hole 24' and has its head 51 held against jumping upward by lips 52 struck upwardly from the sides of the channel portion 21'. Instead of bonding the rubber body 11' to the base members 10' and load members 12', they may be secured thereto by lips 53 struck therefrom and inserted into the rubber body 11'.

The compression portions C and shear portions S of the rubber body may be made of different degrees of hardness to produce different degrees of resilience, in which case the portion C will preferably be of softer rubber than the portion S.

Figure 6:
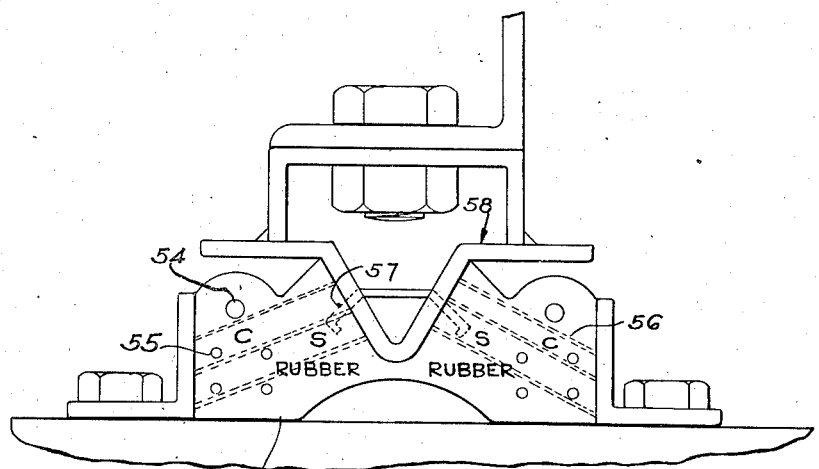
Fig. 6 is a side view of still another modified form of this invention.

In Fig. 6 another way of providing different degrees of resilience of the rubber body 11² is shown. In this case suitable apertures 54 and 55 of various sizes are provided through the compression portion C so as to make the compression portion C softer than the shear portion S. Additional wires, cords, threads or strips 56 are inserted in or attached to the load carrier and base members and embedded in the rubber cushion in order to assist the bonds or rubber in resisting failures and help to tie the parts together. The same also facilitates the action under compression of the angular portion, along which they extend to tie the parts together. The same also facilitates the action under compression of the angular portion, along which they extend into the annular portion of the resilient body, by assuring a compression stress in such portions as the result of, for instance, a vertical motion evidenced by the vibration desired to be cushioned. Separate tie members 57 are shown as extending through the load carrying members 58 into the rubber body 11². In the form shown in Figs. 7 and 8 the rubber body 11 is shown as having the shear portion S bearing for a short distance on the underside of the channel member 22. In Fig. 8 this form is shown as applied on a vertical wall, a pair being used as at 60 and 61 for supporting a load, such as a fan bracket 62.

It will be observed that in mounting the vibration dampeners 60 and 61 they are mounted oppositely; that is, the upper ones are mounted so that the bases are spaced from the wall by means of spacer sleeves 63 on bolts 64 and a spacer sleeve 65 on the bolts 66 connecting the bracket 62 to the load carrier. The lower vibration dampener 61 has its bases secured directly to the wall and its load carrier secured directly to the brackets. As already mentioned, the vibration dampener of any of the above forms may be either in rectangular or circular outline, as shown in Figs. 9 and 10. When made in rectangular outline, it may be made by providing a channel structure member 67 secured by the rubber body to the base T members 68, the plurality of nuts 25 being spaced along the channel structure member 67 so as to provide a complete vibration dampener unit when cut off in sections, as at the line 69.

As shown in Fig. 11, the base member may be a channel member 70 in which is seated the rubber body 71, with two pads, to one wall of which is bonded the load carrier 72. Here we have compression in sequence which is parallel, wherein any number of such pads may be used, and as the load is increased they will successively come into compression.

It will be understood from the foregoing by those skilled in this art that the previous specific disclosure is a related and dependent part of the inventive concept of my invention, one part being method and the other, the specific disclosure of the apparatus by which the method may be advantageously practiced. In the method aspect of my invention the stress of the vibration to be cushioned is communicated to a resilient body. The novelty of such communication resides in the manner and mode in which the stress of a vibration is caused to act upon the body of resilient material, first, by communicating the stress of an initial part of a vibration, to be cushioned, to one portion of said body and thereby compressing said one portion of said body and at least a substantial part of the remaining portion of said body, and thereafter communicating the stress of a subsequent part of such vibration to and thereby further compressing both portions of said body; and that for most efficient results at least a portion of said body should be confined in a limited volume which restricts or prevents lateral movement of said body under compression and admits of only motion of said body in the direction in which said stress is communicated.

I have found that the rubber or resilient material cushions most efficiently and durably when being acted upon to compress such material only in the direction in which the cushioning stress is applied thereto; that the initial cushioning thrust being imparted only to the angular portion of the body afords a most efficient cushion by compressing said portion, but that the remaining portion of said body, at least in substantial part, is placed in more efficient cushioning action by helping by its compression to cushion the initial thrust of a vibration to be cushioned, but that both portions of said body are by their initial thus occasioned compression in condition to more efficiently and durably cushion the stress of the subsequent part of said vibration.

It will be understood that the above description and accompanying drawings comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes only, without the payment of any royalties thereon or therefor.

Having thus set forth and disclosed the nature of this invention, what is claimed is:

1. A cushion support comprising a rubber unit formed to provide an outer compression section and an inner shear section, means associated with said shear section for supporting a load and applying a shear stress therein, said means including abutment means arranged to contact said compression section to compress the same after a predetermined increased load has been applied to said first mentioned means whereby said rubber unit for said increased and still greater loads is subjected in parallel to a simultaneous compression and shear stress to yieldingly support the same, a housing element completely encasing the bottom and outside wall of said compression section and with said abutment means resisting deformation of said compression section under said increased load in three directions.

2. A vibration dampener comprising a pair of opposed base members and a channel shaped load member arranged between the same, each base member having an upright wall opposite a side wall of said channel member and a bottom wall extending toward the bottom wall of the other base member, a rubber unit seated within each base member in engagement with the walls thereof and provided with an upwardly inclined portion in engagement with a side wall of said channel member; and an abutment wall projecting outwardly from each of said channel side walls in overlapping relation to the bottom walls of said base member and normally spaced from the upper surfaces of said rubber units seated within said base members.

3. In the vibration dampener as set forth in claim 2, wherein the inclined portion of each rubber unit is stressed in shear upon movement of said load member toward said base members, that portion of the rubber units seated within said base members including a projecting buffer portion adapted for engagement by said abutment walls after a predetermined deflection of said inclined portions whereby the entire body of said rubber units are subjected to combined compressive and shear stresses, said upright wall of each base member engaging the entire surface of the side of each rubber unit engaged thereby to resist lateral deformation of said rubber units.

4. A vibration dampener comprising an annular base member and a substantially cylindrical cup shaped load member, said base member having a cylindrical wall and a flanged bottom wall, an annular rubber element having a compression portion rectangular in transverse section seated within said base member and engaging the walls thereof and an upwardly inclined shear portion surrounding the wall of said load member, said sheer portion under varying loads being, in transverse section, always a parallelogram and at maximum deformation said transverse section approaches a rectangle, said shear portion projecting beyond the inside peripheral edge of said bottom wall and solely carrying said load member; a radial flange extending from the upper end of said cup-shaped load member in overlapping relation to said bottom wall and normally spaced from the upper surface of said compression portion; said rubber element supporting light loads by a shear action set up by the deflection of said shear portion as said load member approaches said base member, and heavier loads being sustained by the engagement of said radial flange with said compression portion whereby both portions of said rubber element act in parallel and under different stresses to support said heavier loads, said cylindrical wall encasing the entire outer surface of said annular rubber element to resist lateral deformation thereof.

5. A rubber cushioning device for sustaining a load by the resistance of the rubber to deformation under combined shear and compression stresses, having an outer compression portion which in transverse section remains rectangular under varying loads, an inner shear portion angularly disposed with respect to said outer compression portion and which under varying loads is in transverse section always a parallelogram and at maximum deformation approaches a rectangle, a housing which encases the entire outer side wall surface of the outer compression portion for resisting lateral deformation, a support member carried by the inner shear portion having a laterally directed abutment flange extending over and normally spaced from the upper surface of said outer compression portion and adapted to engage the same only after a predetermined deformation of said inner shear section under load, further increase in load being yieldingly supported in parallel by both said inner shear and outer compression portions, the entire device under maximum deformation being substantially in the same plane and rectangular in any transverse section.

6. In the vibration dampener as set forth in claim 2, wherein said channel shaped load member is provided with an opening in the base of the channel, an attaching element seated within said channel and provided with a threaded bore registering with said opening.

JULIAN S. LOEWUS.